(12) United States Patent
Matsumura et al.

(10) Patent No.: US 11,763,465 B2
(45) Date of Patent: Sep. 19, 2023

(54) OBJECT TRACKING APPARATUS, OBJECT TRACKING METHOD AND PROGRAM

(71) Applicant: NIPPON TELEGRAPH AND TELEPHONE CORPORATION, Tokyo (JP)

(72) Inventors: Masaaki Matsumura, Musashino (JP); Kazuki Okami, Musashino (JP); Hajime Noto, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 245 days.

(21) Appl. No.: 17/289,203

(22) PCT Filed: Oct. 7, 2019

(86) PCT No.: PCT/JP2019/039425
§ 371 (c)(1),
(2) Date: Apr. 27, 2021

(87) PCT Pub. No.: WO2020/090352
PCT Pub. Date: May 7, 2020

(65) Prior Publication Data
US 2021/0398295 A1    Dec. 23, 2021

(30) Foreign Application Priority Data
Oct. 29, 2018  (JP) .................. 2018-203081

(51) Int. Cl.
*G06T 7/246*      (2017.01)
*G06V 10/75*     (2022.01)

(52) U.S. Cl.
CPC ............ *G06T 7/248* (2017.01); *G06V 10/758* (2022.01); *G06T 2207/20072* (2013.01)

(58) Field of Classification Search
CPC .......... G06T 7/248; G06T 2207/20072; G06V 10/758
See application file for complete search history.

(56) References Cited

U.S. PATENT DOCUMENTS

2018/0322641 A1    11/2018  Ueda

FOREIGN PATENT DOCUMENTS

| JP | 2006227973 A | 8/2006 | |
| JP | 2014112347 | * 6/2014 | ............... G06T 7/00 |

(Continued)

OTHER PUBLICATIONS

P. Perez et al., Color-Based Probabilistic Tracking, the European Conference on Computer Vision, 2002, pp. 661-675.

(Continued)

*Primary Examiner* — Myron Wyche
(74) *Attorney, Agent, or Firm* — Harness, Dickey & Pierce, P.L.C.

(57) ABSTRACT

A subject tracking device includes a first histogram generation unit configured to generate a first histogram representing an appearance frequency of an image feature quantity of a subject region, for each segment and for each auxiliary segment of the image feature quantity, a second histogram generation unit configured to generate, for each candidate region, a second histogram representing an appearance frequency of the image feature quantity of an image of a candidate region for each segment and for each auxiliary segment of the image feature quantity, a difference derivation unit configured to compare the first histogram with the second histogram for each segment and for each auxiliary segment, and derive, for each candidate region, a total difference value of the appearance frequencies of the image feature quantities of the first histogram and the second histogram; and a region selection unit configured to select (Continued)

the candidate region having a minimum total difference value from among the candidate regions. The auxiliary segment is defined to straddle boundaries between the segments.

12 Claims, 10 Drawing Sheets

(56) References Cited

FOREIGN PATENT DOCUMENTS

| | | |
|---|---|---|
| JP | 2014112347 A | 6/2014 |
| WO | WO-2017081839 A1 | 5/2017 |

OTHER PUBLICATIONS

Motonori Doi et al., Robust Color Object Tracking Method Against Illumination Color Change, SCIS&ISIS 2014, 2014, pp. 718-722.
Deepthi V.K.P and Mr. Mohammed Anvar P.K, Visual Tracking Using HOG and SVM, International Journal of Advanced Engineering Research and Technology(IJAERT), vol. 4, Issue 5, 2016.
David G. Lowe, Object recognition from local scale-invariant features, IEEE International Conference on Computer Vision (ICCV), 1999, pp. 1150-1157.

* cited by examiner

OBJECT TRACKING APPARATUS, OBJECT TRACKING METHOD AND PROGRAM

CROSS-REFERENCE TO RELATED APPLICATIONS

This application is a 371 U.S. National Phase of International Application No. PCT/JP2019/039425 filed on Oct. 7, 2019, which claims priority to Japanese Application No. 2018-203081 filed on Oct. 29, 2018. The entire disclosures of the above applications are incorporated herein by reference.

TECHNICAL FIELD

The present invention relates to a subject tracking device, a subject tracking method, and a program.

BACKGROUND ART

In the technical field of tracking a region including a subject (hereinafter, referred to as "subject region") in a frame image of a moving image, there is a method of tracking the subject region on the basis of a histogram of a feature quantities of an image (a signal intensity). Hereinafter, a frame image including a subject region that is a tracking target is referred to as a "tracking target frame". A frame image referred to by a tracking target frame is referred to as a "reference frame". Hereinafter, a partial region of a frame image of a moving image is referred to as a "partial region". Hereinafter, a feature quantity derived from a pixel signal included in the subject region or the partial region is referred to as "image feature quantity".

FIG. 10 is a diagram illustrating an example of a histogram in a subject region. A histogram is a type of statistical graph that represents a distribution situation of an appearance frequency of data. A vertical axis of the histogram indicates the appearance frequency of data (an image feature quantity). A horizontal axis of the histogram indicates each class of the data (the image feature quantity). Hereinafter, the section divisions which are classes will be referred to as "segments".

A position and size of the subject region in the reference frame are specified in advance. That is, in the reference frame, the partial region 300 including the subject region is determined in advance. The subject tracking device generates a number of appearances of the image feature quantity of the partial region 300 for each segment. The subject tracking device divides the number of appearances of the image feature quantity of each segment by a total number of appearances of the image feature quantity so that a total appearance frequency of the image feature quantities of all the segments of the partial region 300 becomes 1. Thus, the subject tracking device normalizes the number of appearances of the image feature quantity of each segment to generate a histogram representing the appearance frequency of the image feature quantity of the partial region 300.

The subject tracking device defines, for example, a partial region 400 in a range in which the subject region is searched for in the tracking target frame. The subject tracking device generates a histogram representing an appearance frequency of the image feature quantity of the partial region 400. The subject tracking device changes a position and a size of the partial region within a range in which the subject region is searched for in the tracking target frame. In FIG. 10, the subject tracking device defines a partial region 500 in the tracking target frame. The subject tracking device generates a histogram representing an appearance frequency of an image feature quantity of the partial region 500. The subject tracking device may further generate a histogram representing an appearance frequency of an image feature quantity of another partial region.

The subject tracking device derives, for each segment, a difference value between the histogram of the image feature quantity of the partial region of the reference frame and the histogram of the image feature quantity of the partial region of the tracking target frame. The subject tracking device defines, for the tracking target frame, the position and the size of the partial region in which a total difference value of the appearance frequency of the image feature quantity for each segment (hereinafter referred to as a "total difference value") is minimized as the position and the size of the subject region (a tracking result) in the tracking target frame.

A method of converting a pixel value of a frame image input to a subject tracking device to a hue, saturation, and brightness (HSV) format and tracking a subject region on the basis of the hue and the saturation is disclosed in Non Patent Literature 1 for the purpose of preventing degradation of the accuracy of tracking due to a change in illumination environment of the subject (see Non Patent Literature 1). A method of tracking a feature point of an image on the basis of a difference between an image feature quantity and an average value of image feature quantities derived in advance for an entire frame image is disclosed in Non Patent Literature 2 (see Non Patent Literature 2).

Even when the illumination environment of the subject changes, a direction of a pixel gradient of the frame image does not change. A method of tracking a subject region on the basis of a Histograms of Oriented Gradients (HoG) feature quantity that is an image feature quantity that is robust against change in illumination environment of a subject is disclosed in Non Patent Literature 3 and 4 (see Non Patent Literature 3 and 4). When the subject tracking device tracks the subject region on the basis of the HoG feature quantity, the subject tracking device generates a histogram on the basis of the direction of the pixel gradient of the frame image.

CITATION LIST

Non Patent Literature

Non Patent Literature 1: P. Perez, C. Hue, J. Vermaak, and M. Gangnet, "Color-Based Probabilistic Tracking," in Proceeding of the European Conference on Computer Vision, pp. 661-675, 2002.

Non Patent Literature 2: Doi, M., Matsumoto, T., Kimachi, A., Nishi, S., & Ikoma, N. "Robust Color Objects Tracking Method Against Illumination Color Change", 2014 Joint 7th International Conference on Soft Computing and Intelligent Systems (SCIS) and IEEE 15th International Symposium on Advanced Intelligent Systems (ISIS). 718-722, 2014.

Non Patent Literature 3: Deepthi V. K. P and Mr. Mohammed Anvar P. K, "Visual Tracking Using HOG and SVM", International Journal of Advanced Engineering Research and Technology (IJAERT), Volume 4 Issue 5, 2016.

Non Patent Literature 4: D. G. Lowe, "Object recognition from local scale invariant features", Proc. of IEEE International Conference on Computer Vision (ICCV), pp. 1150-1157, 1999.

SUMMARY OF THE INVENTION

Technical Problem

However, when the subject region is tracked by comparing the appearance frequency in the histogram of the image feature quantity between the frame images and an illumination environment of the subject changes between the frame images, a histogram representing an appearance frequency of a feature quantity of brightness changes throughout the histogram. Thus, because the total difference value increases, the accuracy of tracking of the subject region deteriorates. When orientations of the subject are different between the frame images, a histogram representing an appearance frequency of an image feature quantity of a direction of an edge of the image changes throughout the histogram. Thus, because the total difference value increases, the accuracy of tracking of the subject region deteriorates.

In the method disclosed in Non Patent Literature 1, because a hue and a saturation in the frame image change, for example, when a color temperature is changed according to auto white balance of a camera or when the subject is illuminated with colored light, the accuracy of tracking of the subject region deteriorates. In the method disclosed in Non Patent Literature 2, because a feature quantity of brightness changes in a partial region in the frame image and a feature quantity of brightness in other regions in the frame image does not change, for example, when only a subject is irradiated with light of a spotlight, the accuracy of tracking of a subject region deteriorates. In the methods disclosed in Non Patent Literature 3 and 4, a scale-invariant feature transform (SIFT) that is mainly used as the HoG feature quantity, is not affected by affine transformation, but when a perspective in a depth direction is generated in a frame image and parallelism is lost, the accuracy of tracking of a subject region deteriorates.

As described above, the subject tracking device of the related art cannot improve the accuracy of tracking a subject region in a frame image of a moving image in some cases.

In view of the above circumstances, an object of the present invention is to provide a subject tracking device, a subject tracking method, and a program capable of improving the accuracy of tracking a subject region in a frame image of a moving image.

Means for Solving the Problem

An aspect of the present invention is a subject tracking device including: a first histogram generation unit configured to generate a first histogram representing an appearance frequency of an image feature quantity of a subject region, for each segment and for each auxiliary segment of the image feature quantity; a second histogram generation unit configured to generate, for each candidate region, a second histogram representing an appearance frequency of the image feature quantity of an image of a candidate region for each segment and for each auxiliary segment of the image feature quantity; a difference derivation unit configured to compare the first histogram with the second histogram for each segment and for each auxiliary segment, and derive a total difference value for each candidate region, the total difference value being a sum of difference values of the appearance frequencies of the image feature quantities of the first histogram and the second histogram; and a region selection unit configured to select the candidate region having a minimum total difference value from among the candidate regions, wherein the auxiliary segment is defined to straddle boundaries between the segments.

One aspect of the present invention is the subject tracking device described above, wherein the subject region is a partial region of the first frame image, and the candidate region is a partial region of the second frame image.

One aspect of the present invention is the subject tracking device described above, wherein the auxiliary segment group is defined to straddle all the boundaries in a region including the subject region, and the candidate region.

One aspect of the present invention is the subject tracking device described above, wherein at least one of the auxiliary segments is defined to straddle two or more of the boundaries.

One aspect of the present invention is a subject tracking method executed by subject tracking, the subject tracking method including: generating a first histogram representing an appearance frequency of an image feature quantity of a subject region, for each segment and for each auxiliary segment of the image feature quantity; generating, for each candidate region, a second histogram representing an appearance frequency of the image feature quantity of an image of a candidate region for each segment and for each auxiliary segment of the image feature quantity; comparing the first histogram with the second histogram for each segment and for each auxiliary segment, and deriving a total difference value for each candidate region, the total difference value being a sum of difference values of the appearance frequencies of the image feature quantities of the first histogram and the second histogram; and selecting the candidate region having a minimum total difference value from among the candidate regions, wherein the auxiliary segment is defined to straddle boundaries between the segments.

One aspect of the present invention is a program for causing a computer to function as the subject tracking device.

Effects of the Invention

According to the present invention, it is possible to improve the accuracy of tracking a subject region in a frame image of a moving image.

DESCRIPTION OF EMBODIMENTS

Embodiments of the present invention will be described in detail with reference to the drawings.

Figure 1:
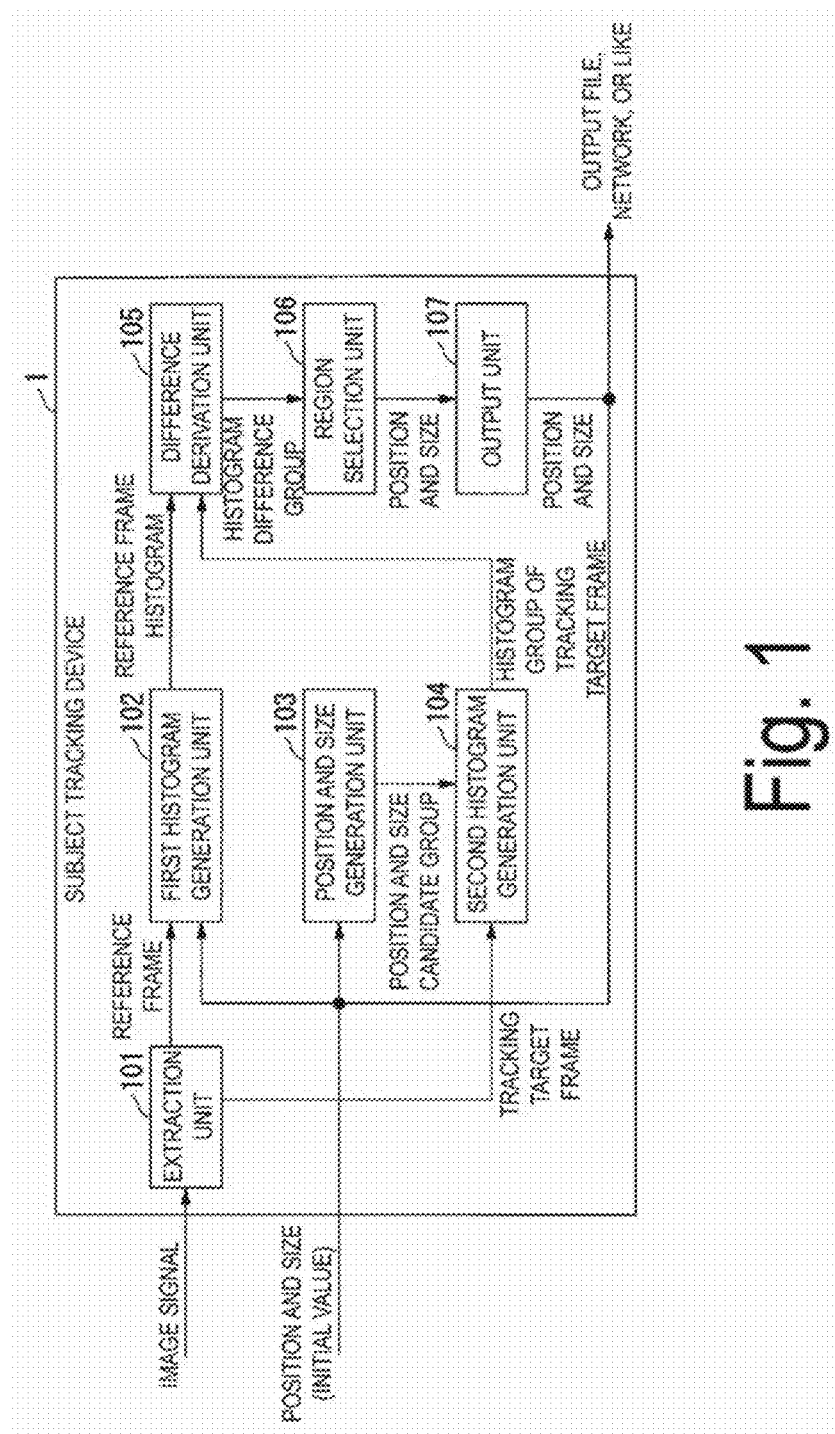
FIG. 1 is a diagram illustrating an example of a configuration of a subject tracking device in an embodiment.

FIG. 1 is a diagram illustrating an example of a configuration of a subject tracking device 1. The subject tracking device 1 is a device that tracks a subject region in a time-series frame image (a moving image). A part or all of the subject tracking device 1 is realized by a processor such as a central processing unit (CPU) executing a program stored in a memory.

Figure 2:
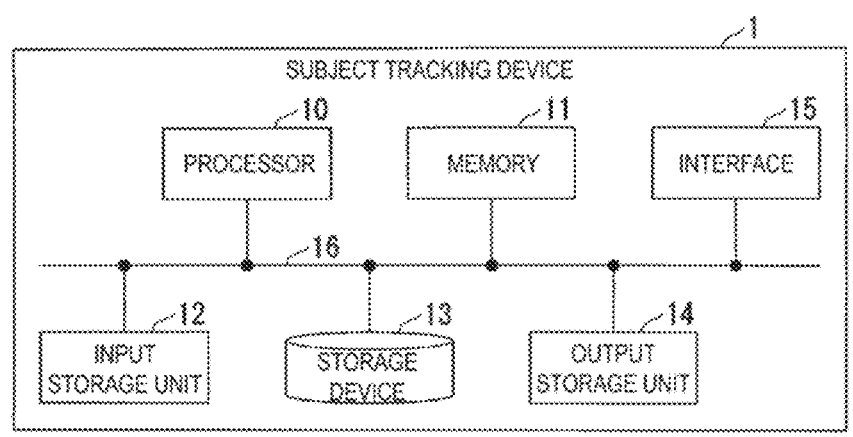
FIG. 2 is a diagram illustrating an example of a configuration of the subject tracking device that executes a program in the embodiment.

FIG. 2 is a diagram illustrating an example of a configuration of the subject tracking device 1 that executes a program in the embodiment. The subject tracking device 1 includes a processor 10, a memory 11, an input storage unit 12, a storage device 13, an output storage unit 14, an interface 15, and a bus 16.

The processor 10 executes a program stored in a memory 11. The memory 11 is a volatile recording medium such as a random access memory (RAM). The memory 11 stores the program loaded from the storage device 13. The input storage unit 12 is a storage unit and stores data such as a frame image (hereinafter referred to as an "input frame") input to the subject tracking device.

The storage device 13 is preferably a non-volatile recording medium (a non-temporary recording medium) such as a flash memory or a hard disk drive (HDD). The storage device 13 may include a volatile recording medium such as a RAM. The storage device 13 stores, for example, a program for causing a processor to execute a process of tracking a subject region in an input frame, a database of positions and sizes of one or more partial regions in the input frame, and a tracking result database.

The output storage unit 14 is a storage unit, and stores data such as a tracking result (a position and size of partial region) to be output. The interface 15 outputs the tracking result to an external device such as a predetermined network. The bus 16 transfers data.

Referring back to FIG. 1, description of the example of the configuration of the subject tracking device 1 will be continued.

The subject tracking device 1 includes an extraction unit 101, a first histogram generation unit 102, a position and size generation unit 103, a second histogram generation unit 104, a difference derivation unit 105, a region selection unit 106, and an output unit 107.

Each of these functional units is realized by the processor 10 executing the program stored in the memory 11. A part or all of the subject tracking device 1 may be realized by using hardware such as a large scale integration (LSI) or an application specific integrated circuit (ASIC).

The extraction unit 101 acquires a plurality of time-series frame images (image signals of moving images). The extraction unit 101 extracts a reference frame in which the position and the size of the subject region are specified and a tracking target frame as input frames from the image signal of the moving image.

The first histogram generation unit 102 acquires initial values of the position and the size of the subject region in the reference frame. The first histogram generation unit 102 acquires the reference frame as an input frame. The first histogram generation unit 102 generates a partial region in the reference frame on the basis of the initial values of the position and the size of the partial region. That is, the first histogram generation unit 102 cuts out a partial region including the subject region from the reference frame on the basis of the initial values of the position and the size of the subject region. The first histogram generation unit 102 generates a histogram representing the appearance frequency of the image feature quantity of the partial region in the reference frame.

The position and size generation unit 103 acquires initial values of the position and the size of the subject region in the reference frame. Hereinafter, candidates for a position and a size, including a subject region in the tracking target frame, are referred to as "candidate regions". The position and size generation unit 103 generates a plurality of combinations of different positions and sizes (a group of candidates for the position and the size, that is, a group of candidate regions) on the basis of the initial values of positions and sizes, in a range in which the subject region is searched for in the tracking target frame.

The second histogram generation unit 104 executes the same histogram generation process as the histogram generation process of the first histogram generation unit 102. The second histogram generation unit 104 acquires the tracking target frame from the extraction unit 101. The second histogram generation unit 104 acquires a group of candidates for the position and the size. The second histogram generation unit 104 generates a histogram of the image feature quantity in the partial region of the tracking target frame according to each image feature quantity of the partial region derived on the basis of the input candidates for the position and the size. Thus, the second histogram generation unit 104 generates a histogram of the number of candidates for the position and the size.

The difference derivation unit 105 compares the histogram of the image feature quantity of the reference frame with the histogram of the image feature quantity of the tracking target frame for each candidate for a position and a size. That is, the difference derivation unit 105 derives a difference value (an absolute value) of the appearance frequency of the image feature quantity for each segment. The difference derivation unit 105 sums, for each partial region, the difference values (histogram difference group) of the image feature quantities of the respective segments. Thus, the difference derivation unit 105 generates a total difference value for each partial region.

The region selection unit 106 selects the partial region having the smallest total difference value from the one or more partial regions of the tracking target frame. The region selection unit 106 outputs the position and the size of the selected partial region to the output unit 107.

The output unit 107 outputs the position and the size of the selected partial region to an output file, a network, or the like designated in advance. The output unit 107 outputs the position and the size of the selected partial region to the first histogram generation unit 102 and the position and size generation unit 103. This allows the region selection unit 106 to also track the subject region in the next tracking target frame on the basis of the position and the size of the partial region output to the first histogram generation unit 102 and the position and size generation unit 103.

Figure 3:
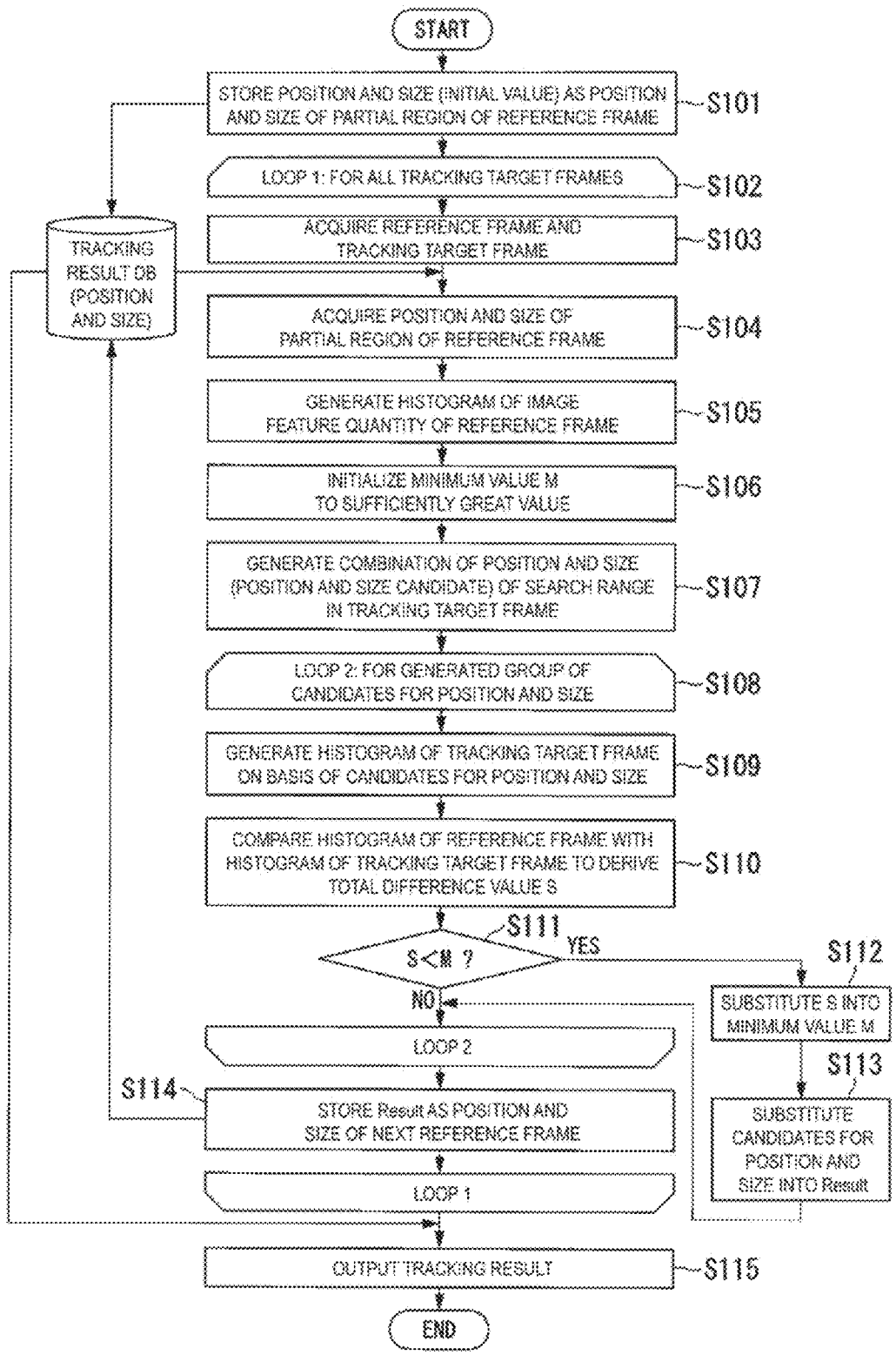
FIG. 3 is a flowchart illustrating an example of an operation of the subject tracking device in the embodiment.

FIG. 3 is a flowchart illustrating an example of an operation of the subject tracking device 1 in the embodiment.

The position and size generation unit 103 stores initial values of the position and the size as the position and the size of the partial region of the reference frame (step S101). The subject tracking device 1 repeats the processes of steps S102 to S114 for all the tracking target frames input to the extraction unit 101 (step S102).

The extraction unit 101 acquires the reference frame and the tracking target frame (step S103). The first histogram generation unit 102 acquires data of the position and the size of the partial region in the reference frame (step S104). The first histogram generation unit 102 generates the partial region in the reference frame on the basis of the initial values of the position and the size. The first histogram generation unit 102 generates the histogram representing the appearance frequency of the image feature quantity of the partial region in the reference frame (step S105).

The region selection unit 106 initializes a minimum value M to a predetermined large value (step S106). The region selection unit 106 generates the plurality of combinations of different positions and sizes (a group of candidates for the position and the size) in the range in which the subject region is searched for in the tracking target frame (step S107). The subject tracking device 1 repeats the processes of steps S108 to S113 for each of the generated candidates for the position and the size (step S108).

The second histogram generation unit 104 generates the partial region in the tracking target frame on the basis of the candidates for the position and the size. The second histogram generation unit 104 generates the histogram representing the appearance frequency of the image feature quantity of the partial region in the tracking target frame (step S109). The difference derivation unit 105 compares the histogram generated by the first histogram generation unit 102 with the histogram generated by the second histogram generation unit 104 to derive a total difference value S (step S110). The difference derivation unit 105 compares the total difference value S with the minimum value M (step S111).

When the total difference value S is equal to or greater than the minimum value M (step S111: NO), the difference derivation unit 105 proceeds the process to step S114. When the total difference value S is smaller than the minimum value M (step S111: YES), the difference derivation unit 105 substitutes the total difference value S into the minimum value M (step S112). The difference derivation unit 105 substitutes the candidates for the position and the size into a variable "Result" representing the tracking result (step S113). The difference derivation unit 105 records the variable "Result" in the tracking result database as initial values of a position and a size of the next reference frame (step S114). The output unit 107 outputs the variable "Result" representing the tracking result to an output file or the like (step S115).

Figure 4:
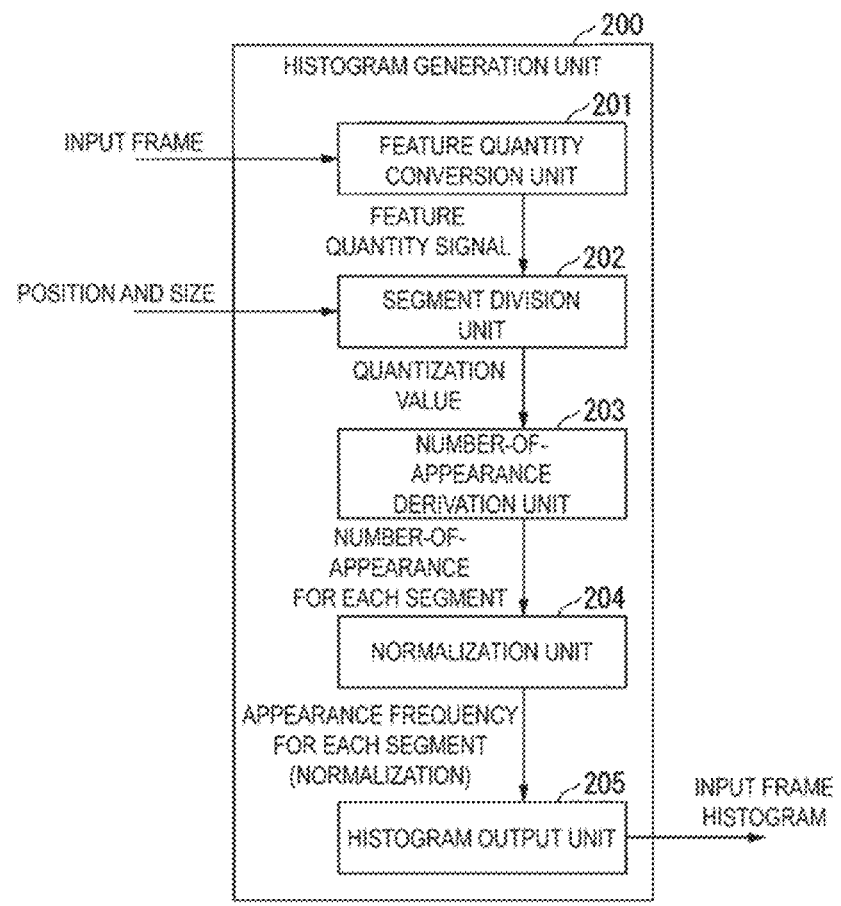
FIG. 4 is a diagram illustrating an example of a configuration of a histogram generation unit.

Next, the histogram generation process will be described. FIG. 4 is a diagram illustrating an example of a configuration of the histogram generation unit 200 shown as a comparison target of the first histogram generation unit 102 and the second histogram generation unit 104 of the embodiment. The histogram generation unit 200 includes a feature quantity conversion unit 201, a segment division unit 202, a number-of-appearances derivation unit 203, a normalization unit 204, and a histogram output unit 205.

The feature quantity conversion unit 201 converts a pixel value of an input frame to an image feature quantity of a predetermined type (for example, hue, saturation, and brightness). The segment division unit 202 divides the image feature quantity of the partial region derived on the basis of the input position and size into segment groups at predetermined intervals (a quantization size). That is, the segment division unit 202 defines the segments (classes) at predetermined intervals in the image feature quantity of the partial region.

Figure 5:
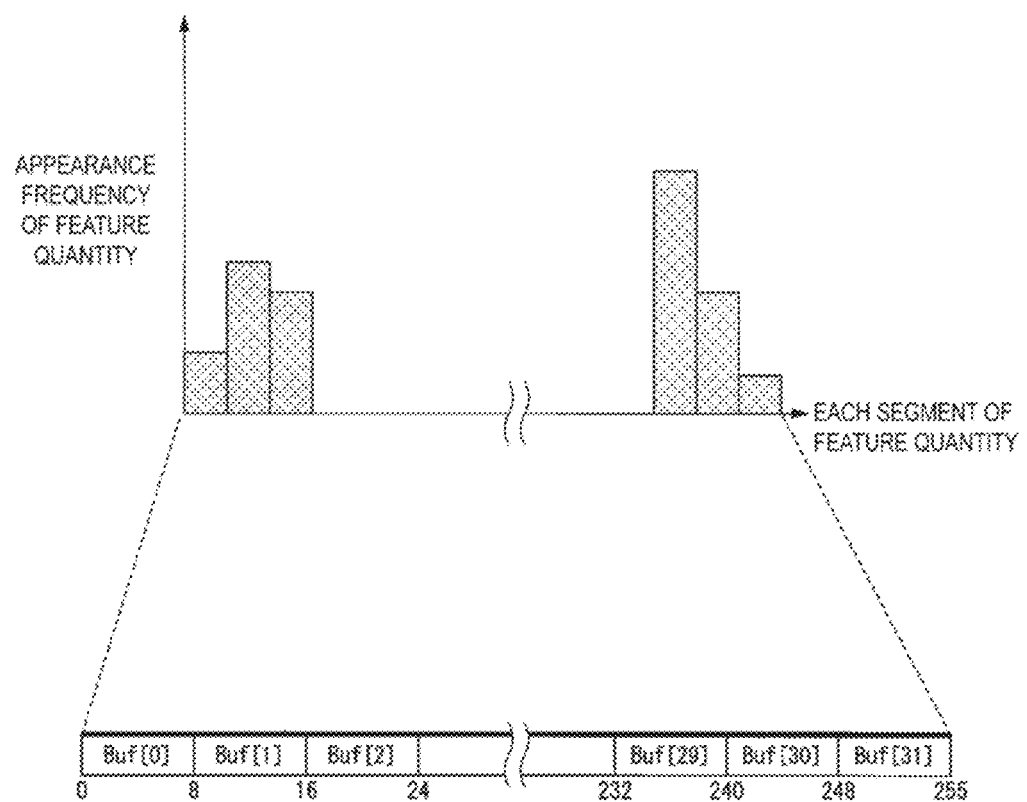
FIG. 5 is a diagram illustrating an example of a relationship between an array Buf of image feature quantities divided into a plurality of segments and a histogram.

FIG. 5 is a diagram illustrating an example of a relationship between an array Buf of image feature quantities (classes) divided into a plurality of segments and a histogram. A value of the array Buf of each segment represents the appearance frequency of the image feature quantity of the segment. The image feature quantity is, for example, a feature quantity of brightnesses of pixels. The brightness is represented by a value from 0 to 255, for example. In FIG. 5, as an example, the number N of segments in the partial region (the number of elements of the array) is 32 (=quantization values "0" to "31"). An offset value O of the image feature quantity is 0. The quantization size (a size of the segment) D is 8.

Referring back to FIG. 4, description of an example of a configuration of the histogram generation unit 200 will be continued. The number-of-appearances derivation unit 203 derives the number of appearances of the image feature quantity of the partial region for each segment. The normalization unit 204 derives a total number of appearances of the image feature quantity of the respective segments for the input frame. The normalization unit 204 executes a division process so that a total appearance frequency of the image feature quantities of all the segments of the partial region becomes 1, to normalize the number of appearances of the image feature quantity of each segment. The histogram output unit 205 outputs the normalized appearance frequency to the difference derivation unit as a histogram of the appearance frequency of the image feature quantity for each segment.

Figure 6:
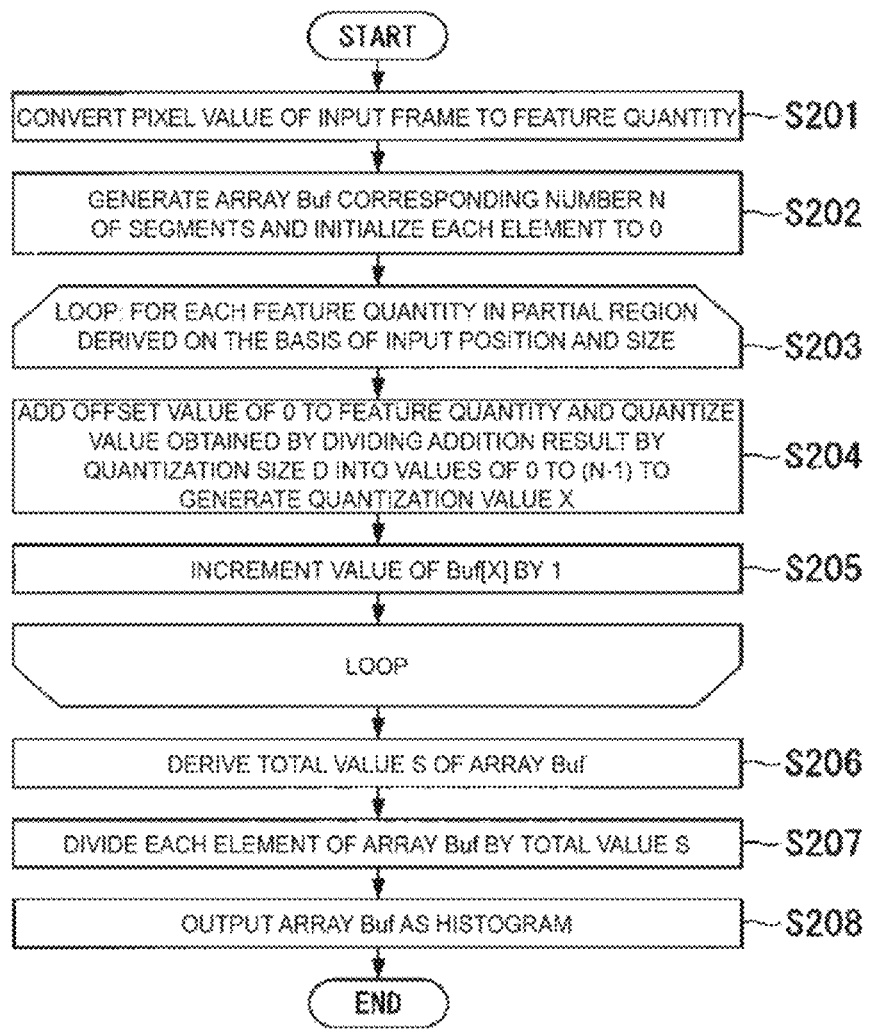
FIG. 6 is a flowchart illustrating an example of a histogram generation process executed by a histogram generation unit.

FIG. 6 is a flowchart illustrating an example of the histogram generation process that is executed by the histogram generation unit 200, which is shown as a comparison target of the histogram generation process of the embodiment. The feature quantity conversion unit 201 converts the pixel value of the input frame to the image feature quantity of the predetermined type (step S201). The segment division unit 202 generates N arrays Buf (arrays Buf[0] to Buf[N−1]) corresponding to the number of segments (a number of divisions). The segment division unit 202 initializes a value of each element of the array Buf 0 (step S202).

The histogram generation unit 200 repeats the process of step S204 for each image feature quantity of the partial region derived on the basis of the input candidates for the position and the size (step S203). The segment division unit 202 adds a predetermined offset value O to the image feature quantity. The segment division unit 202 quantizes (clips) a result obtained by dividing the offset image feature quantity by a quantization size D into, for example, a quantization value from "0" to "N−1" to generate a quantization value X of the offset image feature quantity (step S204). The segment division unit 202 increments a value (the number of appearances) of the array Buf[X] by 1 (step S205).

The number-of-appearances derivation unit 203 derives a total value Si of the values of the respective elements of the array Buf (step S206). The normalization unit 204 divides the value of each element of the array Buf by the total value Si (step S207). The histogram output unit 205 outputs the array Buf to the difference derivation unit as a histogram of the image feature quantity of the partial region of the input frame (step S208).

Figure 7:
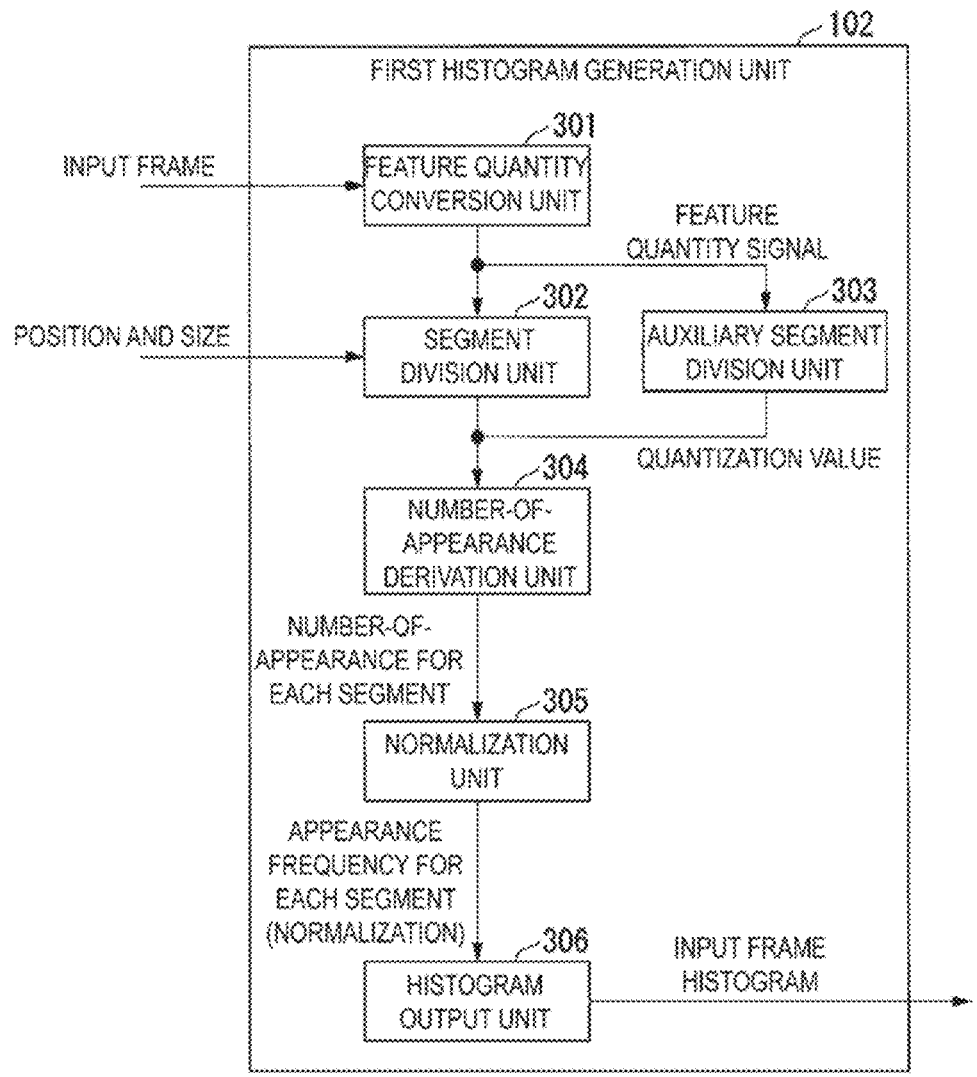
FIG. 7 is a diagram illustrating an example of a configuration of a histogram generation unit in the embodiment.

FIG. 7 is a diagram illustrating an example of a configuration of the first histogram generation unit 102 in the embodiment.

A configuration of the first histogram generation unit 102 and a configuration of the second histogram generation unit 104 are the same. Thus, an example of the configuration of the first histogram generation unit 102 will be described with reference to FIG. 5. The first histogram generation unit 102 includes a feature quantity conversion unit 301, a segment division unit 302, an auxiliary segment division unit 303, a number-of-appearances derivation unit 304, a normalization unit 305, and a histogram output unit 306. Thus, the first histogram generation unit 102 further includes the auxiliary segment division unit 303, as compared with the histogram generation unit 200.

The feature quantity conversion unit 301 converts the pixel value of the input frame to an image feature quantity of a predetermined type. The segment division unit 302 divides the image feature quantity (signal intensity) of the partial region derived on the basis of the input candidates for the position and the size into segment groups at predetermined intervals (the quantization size). That is, the segment division unit 302 determines segments (classes) at predetermined intervals in the image feature quantity of the partial region.

The auxiliary segment division unit 303 divides the image feature quantity of the partial region, that is derived on the basis of the input candidates for the position and the size into auxiliary segment groups at predetermined intervals. That is, the auxiliary segment division unit 303 determines auxiliary classes at predetermined intervals in the image feature quantity of the partial region.

Figure 8:
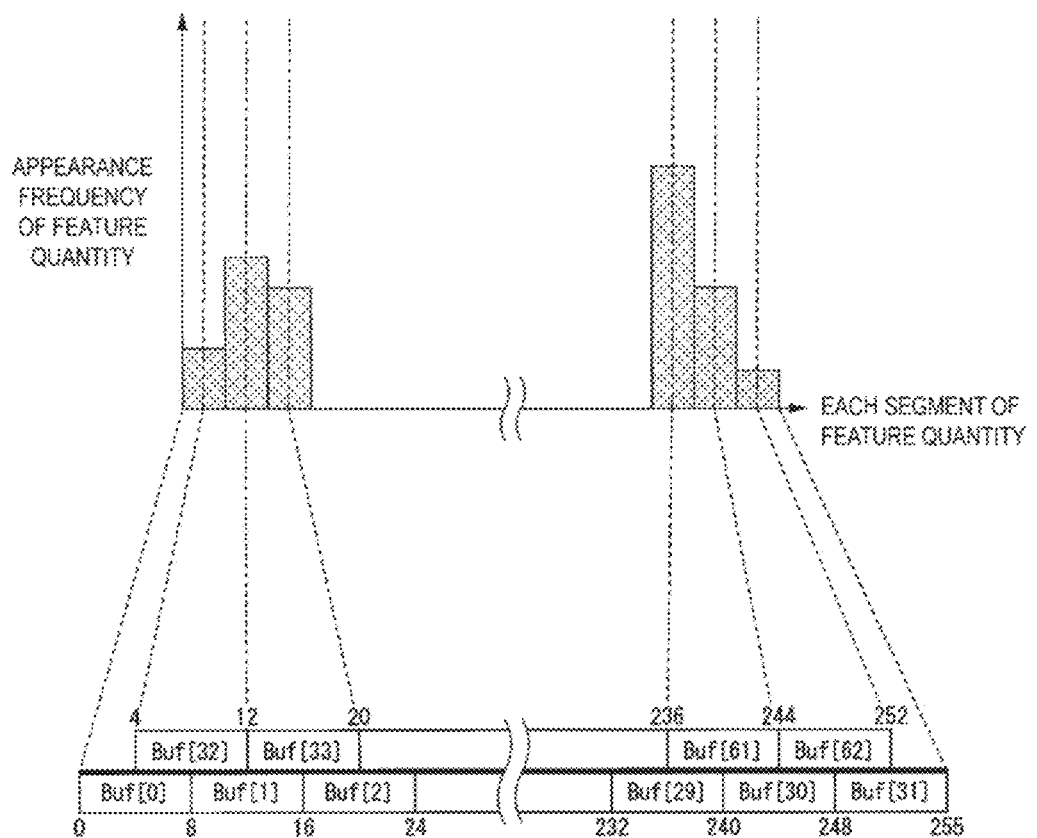
FIG. 8 is a diagram illustrating an example of a relationship between an array Buf of image feature quantities divided into a plurality of segments and a histogram in the embodiment.

FIG. 8 is a diagram illustrating an example of a relationship between the array Buf of the image feature quantities (classes) divided into a plurality of segments and the histogram in the embodiment. A value of the array Buf of each segment represents the appearance frequency of the image feature quantity of the segment. A value of the array Buf of each auxiliary segment represents the appearance frequency of the image feature quantity of the auxiliary segment. The image feature quantity is, for example, a feature quantity of a color difference between pixels. The color difference is represented by a value from 0 to 255, for example. A total number of segments and auxiliary segments is N (=2A−1). In FIG. 8, as an example, the total number N of the segments and the auxiliary segments of the partial region (the number of elements of the array) is 63 (=quantization values from "0" to "62"). The offset value O of the image feature quantity is 0. The quantization size (segment size) D is 8.

In a lower part of FIG. 8, an array Buf[$X_{main}$] of image feature quantities of a plurality of segments in a partial region (in FIG. 8, Buf[0] to Buf[31]) is shown. As an example, the number "A" of segments in the partial region (the number of elements of the array) is 32 (=quantization values "0" to "31"). The offset value 0 of the image feature quantity is 0. The quantization size (segment size) D is 8. In a library (OpenCV) for calculation in a computer vision, a value ranging from 8 to 16 is widely used as the quantization size D. When the quantization size D is 8, the number A of segments is 32 (=256/8).

In an upper part of FIG. 8, an array Buf[$X_{sub}$] of the image feature quantities of one or more auxiliary segments in the partial region (from Buf[32] to Buf[62] in FIG. 8) is shown. As an example, the number "A−1" of auxiliary segments (the number of elements of the array) of the partial region is 31 (=quantization value "32" to quantization value "62"). The offset value O of the image feature quantity is (−D/2). The quantization size (the segment size) D is 8.

Thus, the auxiliary segment group may be defined to straddle all the boundaries between the subject region and the candidate regions (candidates for the position and the size). At least one auxiliary segment may be defined to straddle two or more boundaries.

Referring back to FIG. 7, description of an example of a configuration of the first histogram generation unit 102 will be continued. The auxiliary segment division unit 303 divides the image feature quantity of the partial region into auxiliary segment groups so that the auxiliary segments straddle at least one boundary between adjacent segments. In FIG. 8, the auxiliary segment division unit 303 divides the image feature quantity of the partial region into auxiliary segment groups so that each auxiliary segment straddles each of boundaries between all the segments.

The auxiliary segment division unit 303 may define the auxiliary segments in the histogram so that the auxiliary segments straddle the boundaries between some of the segments according to characteristics of the image feature quantity. For example, because a natural image has characteristics that a feature quantity of a color difference is biased toward a median value (for example, 128 in a range from 0 to 255), auxiliary segments may be defined in a boundary (part) between segments in which the feature quantity of color difference is greatly biased in a histogram. This allows the auxiliary segment division unit 303 to improve the accuracy of tracking without greatly degrading a processing speed, as compared with the case in which the auxiliary segment division unit 303 divides the image feature quantity of the partial region into auxiliary segment groups so that each of the auxiliary segments straddles each of the boundaries between all the segments.

The auxiliary segment division unit 303 may determine an auxiliary segment having a greater quantization size in the histogram. That is, the auxiliary segment division unit 303 may divide the image feature quantity of the partial region into the auxiliary segment groups so that at least one auxiliary segment straddles two or more boundaries between the segments. This allows the auxiliary segment division unit 303 to stably improve the accuracy of tracking with respect to change in the image feature quantity. In order to avoid a difficulty in deriving the image feature quantity of the subject region when the quantization size D of the auxiliary segment is greater than a predetermined size, the auxiliary segment division unit 303 appropriately defines the quantization size of the auxiliary segment according to the characteristics of the image feature quantity of the partial region.

The number-of-appearances derivation unit 304 derives the number of appearances of the image feature quantity of the partial region for each segment and each auxiliary segment. The normalization unit 305 derives a total number of appearances of the feature quantity of each segment for the input frame. The normalization unit 305 executes a division process so that a sum of the appearance frequencies of the image feature quantities of the segments and the auxiliary segments in the partial region becomes 1, and normalizes the number of appearances of the image feature quantity of each segment. The histogram output unit 306 outputs the appearance frequency generated by normalizing the number of appearances to the difference derivation unit 105 as the histogram representing the appearance frequency of the image feature quantity of each segment.

Figure 9:
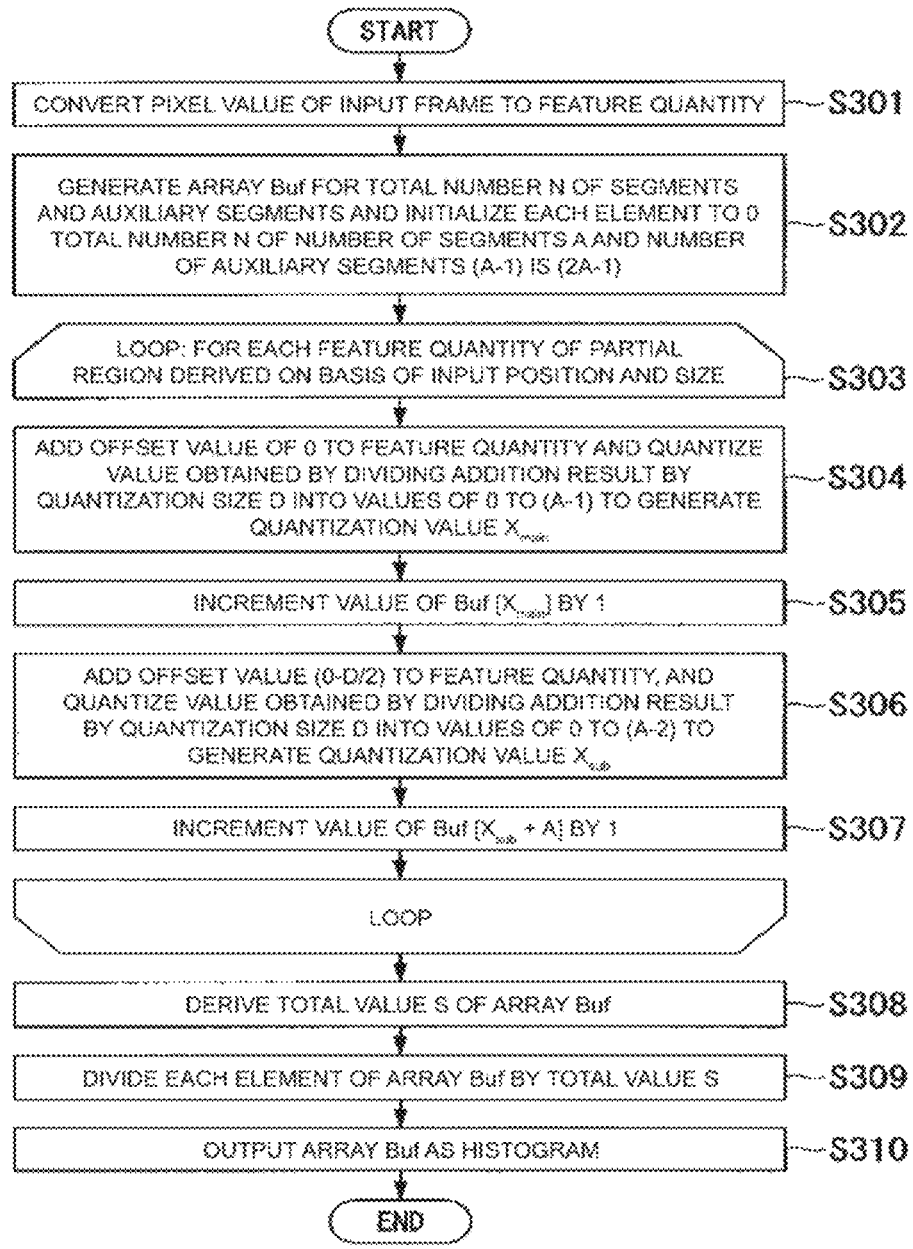
FIG. 9 is a flowchart illustrating an example of a histogram generation process in the embodiment.
Figure 10:
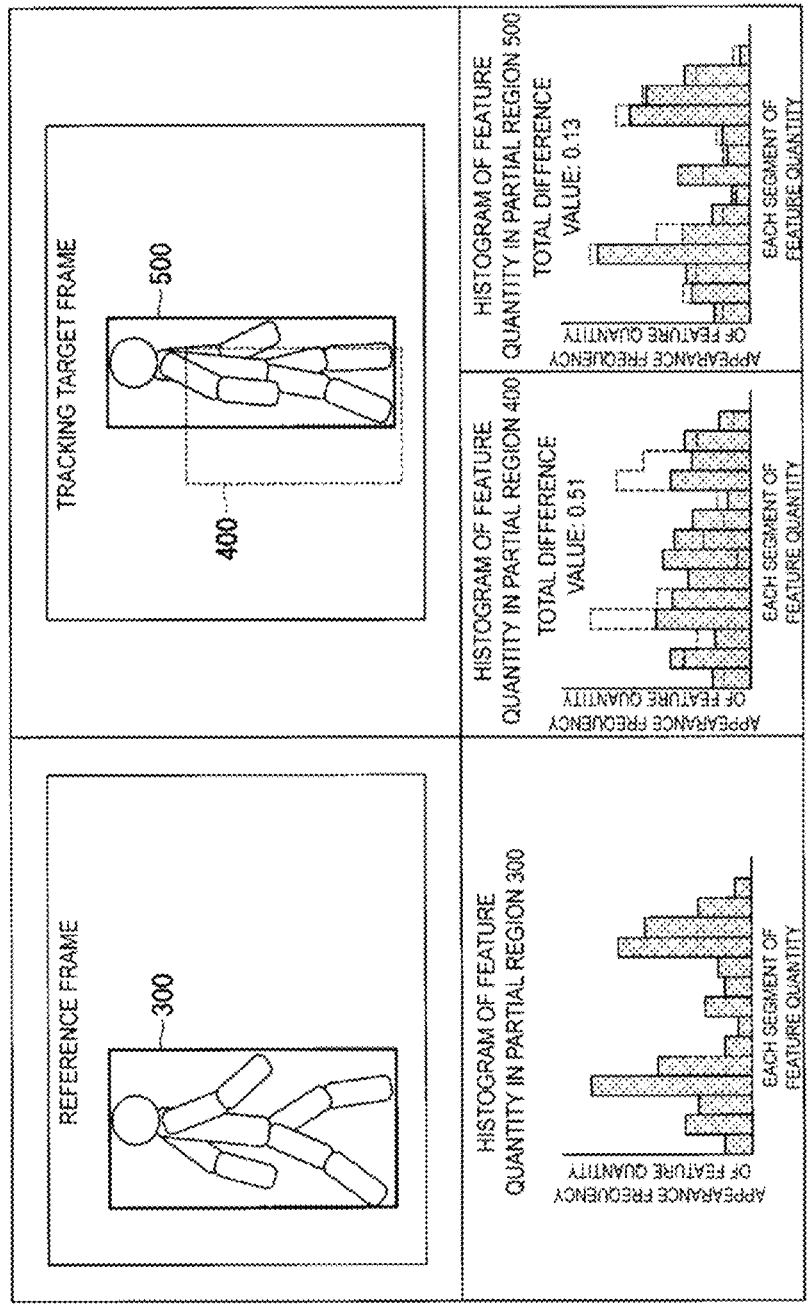
FIG. 10 is a diagram illustrating an example of a histogram in a subject region.

FIG. 9 is a flowchart illustrating an example of a histogram generation process according to the embodiment. The feature quantity conversion unit 301 converts the pixel value of the input frame into an image feature quantity of a predetermined type (step S301). The segment division unit 302 generates an array Buf (Buf[0] to Buf[A−1]) of image feature quantities of A segments, and initializes a value of each element of this array Buf to 0. The auxiliary segment division unit 303 generates an array Buf (Buf[A] to Buf[N−1]) of image feature quantities of (A−1) segments and initializes the value of each element of this array Buf to 0 (step S302).

The first histogram generation unit 102 and the second histogram generation unit 104 repeat the processes of steps S303 to S307 for each image feature quantity of the partial region derived on the basis of the input candidates for the position and the size (step S303). The segment division unit 302 adds a predetermined offset value O (=0) to the image feature quantity. The segment division unit 302 quantizes (clips) the result obtained by dividing the offset image feature quantity by the quantization size D into, for example, a quantization value from "0" to "A−1" to generate a quantization value $X_{main}$ of the offset image feature quantity (step S304). The segment division unit 302 increments a value (the number of appearances) of the array Buf[$X_{main}$] by 1 (step S305).

The auxiliary segment division unit 303 adds a predetermined offset value O (=0−D/2) to the image feature quantity. The segment division unit 302 quantizes (clips) the result of dividing the offset image feature quantity by the quantization size D into, for example, a quantization value from "0" to "(A−1)−1" to generate a quantization value $X_{sub}$ of the offset image feature quantity (step S306). The auxiliary segment division unit 303 increments a value (the number of appearances) of the array Buf[$X_{sub}$+A] by 1 (step S307). The number-of-appearances derivation unit 304 derives the total value Si of the values of the respective elements of the array Buf (step S308). The normalization unit 305 divides the value of each element of the array Buf by the total value Si (step S309). The histogram output unit 306 outputs the array Buf to the difference derivation unit 105 as the histogram of the image feature quantity of the partial region of the input frame (step S310).

As described above, the subject tracking device 1 of the embodiment includes the first histogram generation unit 102, the second histogram generation unit 104, the difference derivation unit 105, and the region selection unit 106. The first histogram generation unit 102 generates a first histogram that represents the appearance frequency of the image feature quantity of the subject region in each segment and each auxiliary segment of the image feature quantity. The second histogram generation unit 104 generates, for each candidate region, a second histogram representing the appearance frequency of the image feature quantity of the candidate region for each segment and each auxiliary segment of the image feature quantity. The difference derivation unit 105 compares the first histogram with the second histogram for each segment and each auxiliary segment, and derives a total difference value that is a sum of the difference values of the appearance frequency of the image feature quantity between the first histogram and the second histogram for each candidate region. The region selection unit 106 selects the candidate region having the smallest total difference value from among the respective candidate regions. The auxiliary segment is defined to straddle the boundaries between the segments.

For example, in FIG. 8, when the value of the array Buf[0] representing one segment suddenly changes between the reference frame and the tracking target frame, because a difference value of the array Buf[0] increases, a total difference value of each segment increases. Similarly, when a value of the array Buf[1] suddenly changes, the total difference value of each segment increases. When the total difference value of each segment is great, the accuracy of tracking of the subject region deteriorates. On the other hand, a value of the array Buf[32] representing one auxiliary segment defined to straddle a boundary between the array Buf[0] and the array Buf[1] is an average value of the value of the array Buf[0] and the value of the array Buf[1]. Thus, even when the value of the array Buf[0] or the value of the array Buf[1] suddenly changes between the reference frame and the tracking target frame, a difference value of the array Buf[32] does not so increase and a total difference value of each auxiliary segment does not increase. Because the total difference value of each auxiliary segment does not become great, degradation of the accuracy of tracking of the subject region is curbed as compared with a case in which the subject region is tracked on the basis of only the total difference value of each segment. This allows the subject tracking device 1 of the embodiment to improve the accuracy of tracking of the subject region in the frame image of the moving image.

The subject region may be a partial region of the first frame image of the moving image. The candidate region may be a partial region of the second frame image of the moving image.

When the image in the input frame changes gently, the subject tracking device 1 compares the appearance frequencies of the image feature quantities for the histogram representing the appearance frequency of the image feature quantity for each first segment and the histogram representing the appearance frequency of the image feature quantity for each second segment. The first segment is a class that partitions (divides) the image feature quantity at predetermined intervals. The second segment is an auxiliary segment defined to straddle a boundary between the first segments. "changes gently" means that an influence of change in time difference between the reference frame and the tracking target frame on the histogram is, for example, one or less segment (for example, half or less of one segment).

Because the subject tracking device 1 can curb an increase in the total difference value between the segments on the basis of the second segment, it is possible to prevent degradation of the accuracy of tracking. The subject tracking device 1 can prevent the accuracy of tracking from degrading only by adding the second segment (auxiliary segment) to the first segment.

Although the embodiment of the present invention has been described in detail above with reference to the drawings, a specific configuration is not limited to this embodiment, and includes a design or the like without departing from the gist of the present invention.

For example, the number of tracking target frames may be plural. The subject tracking device 1 may detect a partial region in which a total difference value between the histogram of the image feature quantity of the partial regions of the reference frame and the histogram of the image feature quantity of the partial regions of the plurality of tracking target frames is minimized. A plurality of subject regions may be tracked in the tracking target frame. A shape of the region (portion) in the input frame may not be a rectangle or may be any shape such as a circle.

INDUSTRIAL AVAILABILITY

The present invention can be applied to an image processing system.

REFERENCE SIGNS LIST

1 Subject tracking device
10 Processor

11 Memory
12 Input storage unit
13 Storage device
14 Output storage unit
15 Interface
16 Bus
101 Extraction unit
102 First histogram generation unit
103 Position and size generation unit
104 Second histogram generation unit
105 Difference derivation unit
106 Region selection unit
107 Output unit
200 Histogram generation unit
201 Feature quantity conversion unit
202 Segment division unit
203 Number-of-appearances derivation unit
204 Normalization unit
205 Histogram output unit
300 Partial region
301 Feature quantity conversion unit
302 Segment division unit
303 Auxiliary segment division unit
304 Number-of-appearances derivation unit
305 Normalization unit
306 Histogram output unit
400 Partial region
500 Partial region

The invention claimed is:

1. A subject tracking device comprising:

a processor; and a storage medium having computer program instructions stored thereon, when executed by the processor, perform to:

extract a reference frame and a tracking target frame from a plurality of time-series frames of a moving image, each of the reference frame and the tracking target frame having a subject region, a first positional information of the subject region being specified in the reference frame;

generate a partial region including the subject region from the reference frame based on the first positional information;

generate a first histogram representing an appearance frequency of an image feature quantity of the partial region for each of segments and for each of auxiliary segments of the image feature quantity;

generate a plurality of candidate regions including the subject region from the tracking target frame, the plurality of candidate regions being specified by different positional information based on the first positional information;

generate a plurality of second histograms, each of the plurality of second histograms representing an appearance frequency of the image feature quantity of each of the plurality of candidate regions for each of the segments and for each of the auxiliary segments of the image feature quantity;

compare the first histogram with each of the plurality of second histograms for each of the segments and for each of the auxiliary segments, and derive a total difference value for each of the plurality of candidate regions, the total difference value being a sum of difference values of the appearance frequencies of the image feature quantities of the first histogram and of the plurality of second histograms;

select a tracking candidate region of the plurality of candidate regions having a minimum total difference value among the total difference values of the plurality of candidate regions; and track a target of the subject region in the moving image based on the selected tracking candidate region, wherein a range of a first auxiliary segment of the auxiliary segments spans two boundaries of a range of three continuous segments of the segments of the image feature quantities, and the image feature quantity in the range of the three continuous segments is greatly biased than other segments of the segments in the first histogram.

2. The subject tracking device according to claim 1, wherein the image feature quantify corresponds to a color difference between pixels of the moving image, and a value of the color difference has a range of 0 to 255, and the first auxiliary segment spans the two boundaries of the three continuous segments having a median value of the range of 0 to 255.

3. The subject tracking device according to claim 1, wherein the image feature quantify corresponds to brightness of pixels of the moving image.

4. The subject tracking device according to claim 3, wherein the image feature quantity corresponds to a signal intensity of the brightness of the pixels.

5. A subject tracking method for causing a processor to execute computer program instructions stored in a storage medium, the subject tracking method comprising executing on the processor the steps of:

extracting a reference frame and a tracking target frame from a plurality of time-series frames of a moving image, each of the reference frame and the tracking target frame having a subject region, a first positional information of the subject region being specified in the reference frame;

generating a partial region including the subject region from the reference frame based on the first positional information;

generating a first histogram representing an appearance frequency of an image feature quantity of the partial region for each of segments and for each of auxiliary segments of the image feature quantity;

generating a plurality of candidate regions including the subject region from the tracking target frame, the plurality of candidate regions being specified by different positional information based on the first positional information;

generating a plurality of second histograms, each of the plurality of second histograms representing an appearance frequency of the image feature quantity of each of the plurality of candidate regions for each of the segments and for each of the auxiliary segments of the image feature quantity;

comparing the first histogram with each of the plurality of second histograms for each of the segments and for each of the auxiliary segments, and deriving a total difference value for each of the plurality of candidate regions, the total difference value being a sum of difference values of the appearance frequencies of the image feature quantities of the first histogram and each of the plurality of second histograms;

selecting a tracking candidate region of the plurality of candidate regions having a minimum total difference value among the total difference values of the plurality of candidate regions; and tracking a target of the subject region in the moving image based on the selected tracking candidate region, wherein a range of a first auxiliary segment of the auxiliary segments spans two boundaries of a range of three continuous segments of the segments of the image feature quantities, and the image feature quantity in the range of the three continuous segments is greatly based than other segments of the segments in the first histogram.

6. A non-transitory computer-readable medium having computer program instructions for causing a processor of a computer to execute a process to perform the steps of:

extracting a reference frame and a tracking target frame from a plurality of time-series frames of a moving image, each of the reference frame and the tracking target frame having a subject region, a first positional information of the subject region being specified in the reference frame;

generating a partial region including the subject region from the reference frame based on the first positional information;

generating a first histogram representing an appearance frequency of an image feature quantity of the partial region for each of segments and for each of auxiliary segments of the image feature quantity;

generating a plurality of candidate regions including the subject region from the tracking target frame, the plurality of candidate regions being specified by different positional information based on the first positional information;

generating a plurality of second histograms, each of the plurality of second histograms representing an appearance frequency of the image feature quantity of each of the plurality of candidate regions for each of the segments and for each of the auxiliary segments of the image feature quantity;

comparing the first histogram with each of the plurality of second histograms for each of the segments and for each of the auxiliary segments, and deriving a total difference value for each of the plurality of candidate regions, the total difference value being a sum of difference values of the appearance frequencies of the image feature quantities of the first histogram and each of the plurality of second histograms;

selecting a tracking candidate region of the plurality of candidate regions having a minimum total difference value among the total difference values of the plurality of candidate regions; and tracking a target of the subject region in the moving image based on the selected tracking candidate region, wherein a range of a first auxiliary segment of the auxiliary segments spans two boundaries of a range of three continuous segments of the segments of the image feature quantities, and the image feature quantity in the range of the three continuous segments is greatly biased than other segments of the segments in the first histogram.

7. The subject tracking method according to claim 5, wherein the image feature quantity corresponds to a color difference between pixels of the moving image, and a value of the color difference has a range of 0 to 255, and the first auxiliary segment spans the two boundaries of the three continuous segments having a median value of the range of 0 to 255.

8. The subject tracking method according to claim 5, wherein the image feature quantity corresponds to brightness of pixels of the moving image.

9. The subject tracking method according to claim 8, wherein the image feature quantity corresponds to a signal intensity of the brightness of the pixels.

10. The non-transitory computer-readable medium according to claim 6, wherein the image feature quantity corresponds to a color difference between pixels of the moving image, and a value of the color difference has a range of 0 to 255, and the first auxiliary segment spans the two boundaries of the three continuous segments having a median value of the range of 0 to 255.

11. The non-transitory computer-readable medium according to claim 6, wherein the image feature quantity corresponds to brightness of pixels of the moving image.

12. The non-transitory computer-readable medium according to claim 11, wherein the image feature quantity corresponds to a signal intensity of the brightness of the pixels.

* * * * *